D. W. KELLOGG.

REVERSIBLE ECCENTRIC FOR ENGINES.

No. 11,419. Reissued May 15, 1894.

WITNESSES:

H. A. Earhart

S. May Goodrich.

INVENTOR

Dan W. Kellogg.

By Smith & Dennison

ATTORNEYS

UNITED STATES PATENT OFFICE.

DAN W. KELLOGG, OF AUBURN, NEW YORK.

REVERSIBLE ECCENTRIC FOR ENGINES.

SPECIFICATION forming part of Reissued Letters Patent No. 11,419, dated May 15, 1894.

Original No. 472,542, dated April 12, 1892. Application for reissue filed May 22, 1893. Serial No. 475,162.

*To all whom it may concern:*

Be it known that I, DAN W. KELLOGG, of Auburn, in the county of Cayuga and State of New York, have invented certain new and useful Improvements in Reversible Eccentrics for Steam-Engines; and I do hereby declare the following to be a full, clear, and exact description of the invention, such as will enable others skilled in the art to which it appertains to make and use it, reference being had to the accompanying drawings, which form a part of this specification.

My invention relates to an improvement in reversible eccentrics for steam engines; and it consists in the arrangement and combination of parts which will be more fully described hereinafter.

The objects of my invention are to produce a reversible eccentric for reversing the motion of engines of all kinds and in which the rack-face of the shaft, instead of being recessed in it as has heretofore been the case to cause the eccentric to move back and forth across the shaft in guides or ways secured to the driving-disk, and to provide means for taking up all lost motion in the different operative parts.

Figure 1:
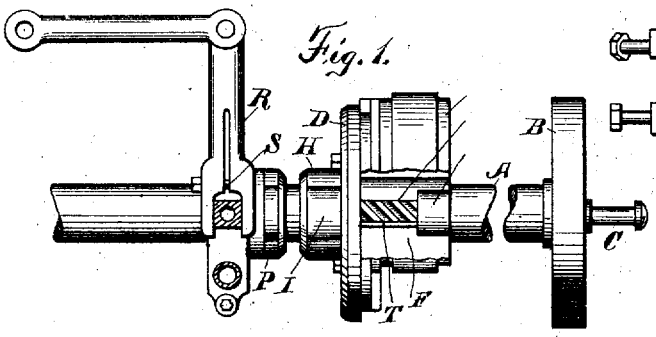
Figure 5:
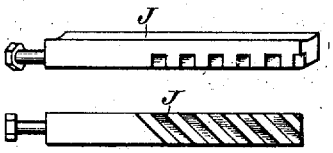
Figure 2:
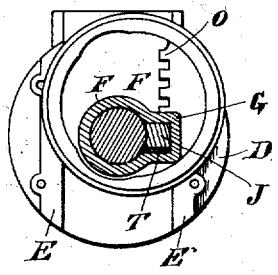
Figure 3:
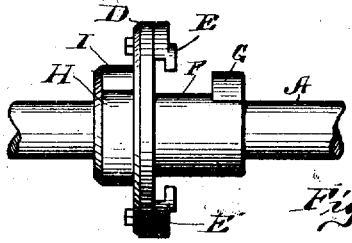
Figure 4:
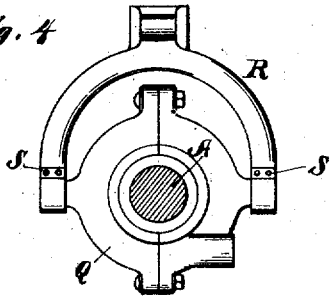
Figure 6:
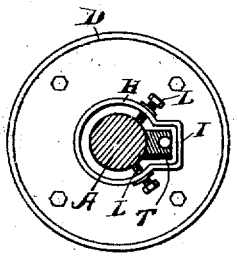

Figure 1, is a side elevation of my invention, complete, parts being broken away; Fig. 2, an end view of the same, taken from the outer end of the eccentric. Fig. 3, is a plan view of the driving-disk and shaft. Fig. 4, is an end view of the cranked lever and its attachments. Fig. 5, shows the sliding rack in two positions. Fig. 6, is an end view of the disk, the shaft and the sliding-rack.

A, represents the driving-shaft, provided with the crank-head —B— and the crank-pin —C— at one end. Secured to this shaft at any suitable point, is the driving-disk —D—, which is provided upon its inner sides with the two guides or ways —E—, which are bolted or secured thereto in any suitable manner, as shown in Fig. 3. Projecting from the inner side of this disk —D— is the sleeve —F—, which extends through the eccentric, and which sleeve has an opening formed through one side, as shown in Fig. 1, so as to allow the teeth of the sliding rack to project through, and which sleeve has the bridge or arch —G— formed upon its outer end so as to form a guide for the sliding rack. This sleeve —F— fits snugly upon the shaft —A—, as shown in Fig. 2, and the bridge or arch —G— extends out sufficiently far to allow the sliding rack to freely move back and forth therein in a direct line with the shaft —A—. Upon the opposite side of the disk there is a short hub —H—, which fits tightly upon the shaft and which is also provided with an outward bend or bridge —I— where the sliding rack —J— passes through. Through this hub —H— are passed the set-screws —L— which bear rigidly against the shaft and secure the disk in position.

Applied to the inner side of the disk —D— is the eccentric —N—, which has flanges formed upon its inner side, so as to catch inside of the guides or ways —E— on the disk —D—, and thus guide the eccentric as it moves back and forth, at right angles across the shaft. In order that this eccentric may be moved back and forth, there is an opening formed through it, as shown in Fig. 2, so that whenever it is desired to reverse the engine, it is only necessary to move the eccentric from one side of the shaft to the other. Formed in the vertical edge of the opening, through the eccentric, are teeth —O— which mesh with the teeth of the sliding rack —J— through the opening in the side of the sleeve —F—. The teeth —O— and the teeth of the rack —J— are cut at such an angle that when the rack is moved endwise the eccentric —N— is made to move from one side of the shaft to the other. To this eccentric —N— is attached the eccentric valve-rod, by means of which the valve is shifted.

The sliding rack —J—, instead of being recessed in the shaft in the usual manner, is applied directly to the side of the shaft —A—, the inner side of the rack-bar being concaved so as to conform to the shape of the shaft. This rack-bar is bolted at one end to the sleeve —P—, which is applied to the shaft —A—, and which is held between the two parts of the ring or clamp —Q—, to which the bell-cranked lever —R— is connected. The lower ends of the lever —R— are split or slotted and have a box working in a slot that fits on trunnions of sleeve strap, as shown in Fig. 1, and through these slotted ends are passed screws —S—, by means of which any lost motion may be taken up. In order to prevent any lost motion, the tapering gib —T— is passed through the opening through the disk —D— and the bridge —G— alongside of the sliding rack, so as to take up any loss of motion and to keep the parts tightly in position.

One of the great advantages of my invention consists in applying the sliding rack, concaved on the under side to fit the surface of the shaft, and thus dispensing with the usual planing of the shaft to form a bed for the rack, as has heretofore been done.

Another advantage consists in the provision for taking up the lost motion in all places where it can occur, and hence the parts will always be held snugly in place.

Having thus described my invention, I claim—

1. The disk D, provided with a sleeve upon its inner side, the sleeve being provided with an opening through one side and a bridge or arch at the outer end of the sleeve, the sliding rack, the toothed eccentric, and a mechanism for moving the rack, all combined and arranged to operate substantially as described.

2. The disk provided with an opening for the passage of the sliding rack, the sliding rack, and a tapering gib, the parts being combined to operate substantially as set forth.

3. The cranked lever —R—, provided with slots at its lower ends and boxes to fit into slots and on trunnions of sleeve-strap, together with screws which are passed through these slotted ends to take up all lost motion, the clamp to which the lever is applied, and the sliding sleeve placed upon the shaft, the parts being combined to operate substantially as specified.

4. The combination with the disk provided with an opening through it, of the sliding rack bar and the guide sleeve, the eccentric and the shaft, substantially as described.

5. The combination with the cylindrical drive shaft, and the eccentric, of the rack-bar concaved to bear and traverse upon the face of the shaft, the guide sleeve and means to operate said rack-bar.

6. In a reversible eccentric, a cylindrical drive-shaft, a sliding rack-bar concaved to bear and traverse upon the face of said shaft, the guide shaft an eccentric and means to operatively connect said eccentric and rack-bar.

DAN W. KELLOGG.

Witnesses:
CHAS. J. STUPP,
HORACE T. COOK.